Jan. 16, 1962    N. J. TRBOJEVICH    3,016,720
HIGH SPEED UNIVERSAL JOINT
Filed Oct. 19, 1959    2 Sheets-Sheet 1
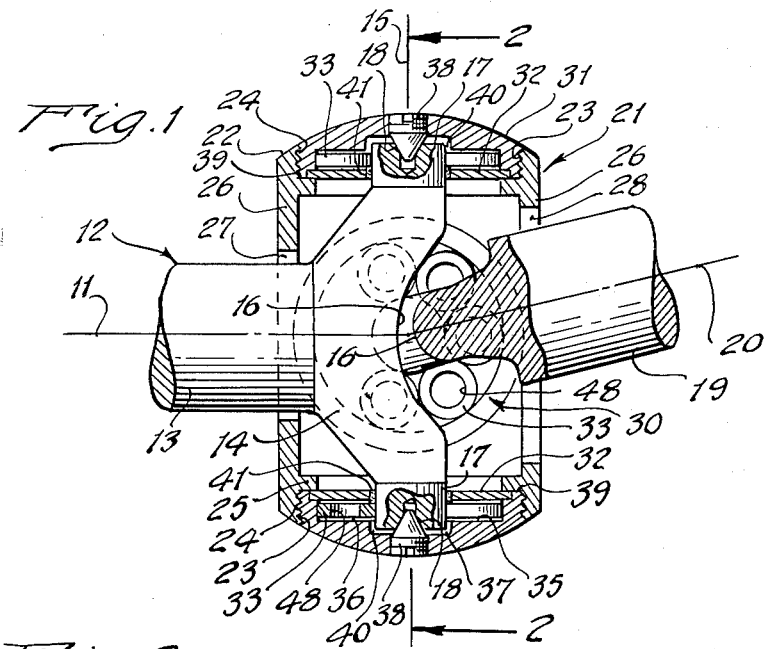
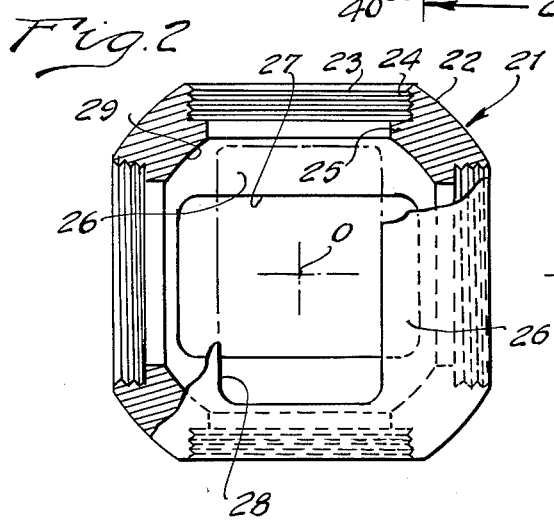
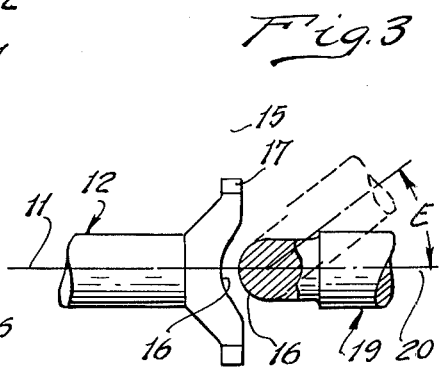
INVENTOR.
NIKOLA J. TRBOJEVICH
BY
Whittemore, Hulbert & Belknap
ATTORNEYS

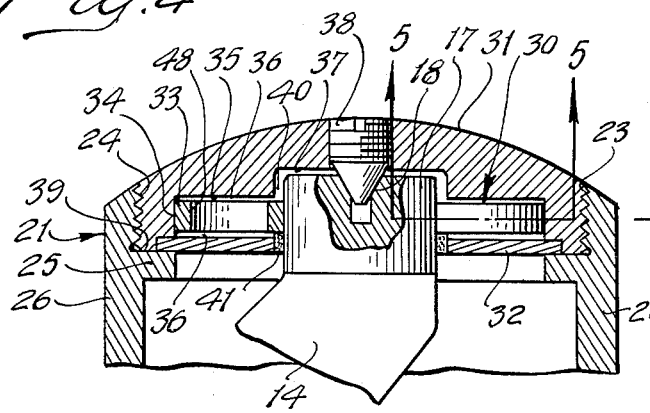

United States Patent Office 3,016,720
Patented Jan. 16, 1962

3,016,720
HIGH SPEED UNIVERSAL JOINT
Nikola J. Trbojevich, Santa Monica, Calif.
(23920 Oxnard St., Woodland Hills, Los Angeles, Calif.)
Filed Oct. 19, 1959, Ser. No. 847,136
14 Claims. (Cl. 64—18)

The invention relates to universal joints of the Cardan type adapted for use in fast running automotive and other engines.

The novelty resides in the improved design of the shafts, the bearings, the cage and means for keeping the cross shafts in alignment with the axes of the bearings.

The bearings used in this joint are an adaptation of the roller bearings first shown in my Patent No. 2,720,430 dated October 11, 1955.

The object is to construct the bearings and the cage that they will generate, as it might be said, counter harmonics by which means the natural harmonics inherent in the Cardan principle are rendered smoother and less harmful. This is accomplished by providing an increased elastic deformation in the said members, thereby increasing the time element during which the impacts result in deformations. As it is well known, the magnitude of the impact or impulse forces is inversely proportional to the time element during which the deformations are accomplished. By this means the stresses are reduced.

Another object is to construct an enveloping cage member in lieu of the conventional Cardan cross member.

A further object is to use relatively narrow bearings and to stabilize the cross shafts by means of adjustable centers in their positions.

Another object is to improve the mechanical efficiency of the joint by using novel bearings of an advanced design.

Still another object is to simplify the driving shafts by avoiding the conventionally used yoked design.

Another object is to provide for adequate lubrication, self-contained in the bearings.

A further object is to streamline the joint by giving it a smooth truncated spherical shape and by avoiding the use of any outwardly projecting rotating members.

Another object is to reduce the outside diameter of the joint for a given torque capacity by radically redesigning the elements and giving them a new form as it will be hereinafter shown.

In the drawings:

FIGURE 1 shows the new joint in elevation and in cross section with both shafts aligned in the plane of paper.

FIGURE 2 is the cross section of the cage member taken on the plane 2—2 of FIGURE 1.

FIGURE 3 is a diagram showing the principle upon which the saddle-shaped surfaces in the cross shafts are designed.

FIGURES 4 and 5 are diagrams explaining the design of roller bearings used in this device.

FIGURE 6 schematically represents the method of assembling the joint.

FIGURES 7 and 8 are geometrical diagrams used in connection with the calculations found in this application.

FIGURE 9 diagrammatically shows a double joint of the new type.

*The shafts*

As shown in FIGURES 1, 3 and 6, the shaft 12 having an axis 11 comprises a cylindrical portion 13, a flattened portion 14 and two trunnions 17 having a cross axis 15 perpendicular to the first said axis, integrally formed with the said shaft.

The central portion of the shaft near the center O of the joint is formed into a curved saddle-shaped surface 16 which is concave in the plane of paper and convex in planes perpendicular thereto. The object is to enable the shaft 12 to rotate about the cross axis 15 in a plane perpendicular to the plane of paper without interfering with the rotation of the second shaft 19 which rotates in the plane of paper. FIGURE 3 illustrates this condition.

The trunnions 17 are each provided with a conical center 18 which acts as a thrust bearing for the shaft.

The second shaft 19 having an axis 20 is preferably a duplicate of the shaft 12, just described.

*The cage*

The cage member 21 is shown in FIGURES 1, 2 and 6.

The member is preferably a hollow casting made of a light metal such as aluminum.

The said cake 21 is formed from a truncated hollow sphere formed from an outer spherical surface 22, an inner spherical face 29 and two relatively thin side walls 26.

There are altogether six apertures in the said cage, namely, four large holes 23, equispaced in the spherical portion and two elongated slots 27 and 28 respectively, in the sidewalls 26.

The holes 23 are provided with a screw thread 24 and a projecting shoulder 25 at the bottom of each hole, the said shoulders serving as seats for the bearings.

The slots 28 and 27 in the side walls 26 have their longitudinal axes disposed at right angles to each other at the opposite sides. As is shown in FIGURE 6, the object is to make those slots just large enough to provide for the insertion of the shaft ends into the cage when assembling the joint and also to permit the shafts to swing to and fro for the required shaft angle, as shown at the right side of FIGURE 1.

Regarding the method of assembling the joint, FIGURE 6, it is to be noted that after the shaft has been inserted into the cage 21, it must be turned around through an angle of 90° in order that the shaft may swing to and fro in the direction of the longitudinal axis of the slot.

As shown in FIGURE 2, the cage is so designed that after the required six apertures have been hollowed out there will be still enough metal left in the structure to provide for the required strength and rigidity.

*The bearings*

The bearings 30, see FIGURES 1, 4 and 5, form an important element in this invention.

As was pointed out in the preamble, the bearings are constructed by following the teachings of a former patent of mine but the design was further advanced by incorporating a thrust bearing as an integral part of the mechanism, whereby the bearing is capable of sustaining both the radial and the axial loads and impacts, all in the same bearing unit.

The bearing assembly 30 consists of a spherically rounded cap 31, a bottom plate 32, an oil seal 41, a plurality of ring shaped rollers 33 and conical set screw 38.

All four bearings are identical with each other, interchangeable and each comprises its own lubricant.

The cap 31 is threaded on its outside circumference, to engage the screw thread 24 in the cage 21 as already mentioned and in its inside circumference comprises a race 34 for the rollers, a smoothly finished upper plane surface 35 adjacent to the rollers within a slight gap 36, a clearance surface 37 to clear the trunnion 17 and a threaded hole concentric with the bearing axis 15 for receiving the set screw 38, the latter engaging the hollow cone 18 in the top of the trunnion 17.

At the bottom circumference of the cap 31, a recess 39 is formed into which the bottom plate 32 containing the oil seal 41 and the clearance gap 36 is tightly fitted. The bearing is lubricated by removing the said set screw 38.

The rollers 33 are each provided with a coaxial hole 48 and are smoothly finished all over in order to prevent the formation of fatigue cracks from impacts inherent in Cardan joints. The width and the hole in the roller are usually so proportioned that with respect to the outside diameter of the roller, the width is about one-fourth and the hole is about three-fourths of the said diameter.

As shown in FIGURE 4, the roller 33 is surrounded on its three sides by three smoothly finished surfaces 32, 34 and 35 respectively while the remaining fourth side slightly protrudes from the rectangular slot formed by the said three surfaces and contacts the trunnion 17.

The upper plane surface 35 of the cap 31 is prevented from touching the trunnion 17 by means of the gap 40 while the lower plate 32 touches the trunnion 17 through the medium of an oil seal 41 as already stated, whereby the bearing will be oil tight after being assembled upon the said trunnion.

In FIGURE 5, the disposition of the rollers 33 in a single row and in contact with the trunnion 17, the bottom plate 32 and the race 34 is shown. The adjacent rollers also loosely contact each other, there being provided a slight circumferential clearance amounting to only a few thousandths of an inch about the circle 42.

When the trunnion 17 is rotated in the direction of the arrow 43 while the outer race 34 is held firm, the rollers will rotate epicyclically, i.e., they will rotate about their own axes and also about the axis of the trunnnion. In experimenting with this type of bearings, I found that the combination of the holes 48 in the rollers with the epicyclic rotation, as indicated by the arrows, produced an outstanding oil pumping action, thus making this bearing one among the most efficient of antifrictional bearings.

Another advantage of this arrangement resides in the ability of the rollers to increase the duration in time of deformations caused by the impulse or impact forces F and thereby reduce the stresses. This is explained by the fact that rollers of this kind deform under loads not only locally as do the solid rollers but they also bend into a slightly elliptic shape, like beams.

In Cardan joints, the forces F, FIGURE 5, are the result of accelerations and decelerations and these in turn are due to the tendency of the adjacent trunnions to approach or to retard from each other, see the arc of the great circle $c$, FIGURES 7 and 8. In constant velocity joints, such as in those described in my Patents 2,584,097 and 2,839,905, said impacts F do not exist. In this invention, the object is to minimize the said impacts as much as possible and this can be done successfully providing that the shaft angle E does not exceed about 8° to 10°.

The said impacts F occur during each quadrant of revolution in all four bearings. Thus, the forces F shown in FIGURE 5 are harmonics of a wave length of 180° and change their signs from positive to negative four times during each revolution. The frequency of impacts is quite considerable for fast running shafts. For example, a shaft rotating at 4000 r.p.m. will produce 266 impacts per second and the time interval between successive impacts in each bearing is equal to $3.7 \times 10^{-3}$ seconds.

In bearings using solid rolling members, the duration of a deformation resulting from an impact was found in laboratory measurements to be of an order of $1.5 \times 10^{-4}$ seconds, see Timoshenko Engineering Mechanics, page 326. In addition, the depth of penetration is practically infinitesimal in that instance. Therefore, the impact forces F may exceed several times the corresponding static forces such as may originate e.g. from the transmitted torque. As is, it is well known, the definition of the impulse is:

$$\text{Impulse} = \int F dt \qquad (1)$$

from which it follows that the force F may become very large if the time element needed for deformation $dt$ is too short. It is the object of this invention to increase the time element $dt$ by suitably redesigning the bearings 30 and the cage 21. Interestingly, when such corrective measures are applied even in part, the magnitude of the impact forces F is automatically reduced and if the correction is complete, the Cardan joint becomes practically a constant velocity joint.

Double joints

In FIGURE 9 the method of hooking up two or more joints of the described kind in series for the purpose of obtaining a greater cumulative shaft angle than could be obtained in a single joint is shown. The diagram is self-explaining and needs no further elucidation.

The theory

The theory of constant velocity universal joints was thoroughly discussed in my said Patent No. 2,584,097, pages 6 to 11 inclusive and on page 9, lines 45 to 51, a conclusion was reached that "any joint comprising a Cardan cross in which the two arms of the cross are rigidly held at right angles with respect to each other . . . cannot transmit the angular velocities at a constant ratio."

In this invention, the bearings and the cage are designed not only so that the adjacent trunnions can approach to or retard from each other harmonically through the required small distances but the said members are also capable of vibrating with the required frequency of about 200 to 300 cycles per second as was already mentioned in a previous paragraph.

The said approach or retardation may be exactly calculated from the diagrams, FIGURES 7 and 8.

A sphere 44 having a unit radius and a center at the point 0 is so drawn that the projections of the shaft axes 11 and 20, the angle bisecting plane 47 and the respective paths of the trunnions 45 and 46, all lie in the plane of paper and intersect at the sphere center 0.

It is now desired to calculate the distance $c$ (as measured along a great circle) which is a leg of a spherical triangle $bxc$, see also FIGURE 8.

It is assumed that both shaft axes 11 and 20 rotate with a constant velocity in the direction of the arrows. This is, of course, impossible to do in a Cardan joint unless the arc $c$ is made variable.

Let the shaft angle be denoted with $E=2e$ and let both shafts rotate through an angle $x$ from their respective initial positions 0 and 49.

The general spherical trigonometric formula covering this case is the following:

$$\cos c = \cos a \cos b + \sin a \sin b \cos \gamma \qquad (2)$$

The following substitutions are now made:

$$b = 90° - x; \cos b = \sin x \qquad (3)$$
$$\gamma = 180° - E; \cos \gamma = -\cos E \qquad (4)$$
$$c = 90° \pm y; \cos c = \pm \sin y \qquad (5)$$

in which $y$ is a very small angle and indicates the correction necessary to improve the classical Cardan joint.

After the above substitutions are effected, the Equation 2 becomes:

$$\pm \sin y = \cos x \sin x - \cos x \sin x \cos E \qquad (6)$$
$$\sin 2x = 2 \cos x \sin x \qquad (7)$$

$$\pm \sin y = \frac{\sin 2x}{2}(1 - \cos E) \qquad (8)$$

An inspection of the above equation shows that $$y = 0, \text{ when } x = 0 \text{ or } x = 90° \qquad (9)$$
$$y = \text{maximum, when } x = 45° \text{ or } 90° + 45° \qquad (10)$$

The maximum or minimum values of $y$ are our only interest. The said values of the distance y, in radians, are now given:

Shaft angle E°:  ±y (radians)
 0° ............................................. .0000
 4° ............................................. .0012
 8° ............................................. .0048
 12° ............................................ .0109
 16° ............................................ .0195
 20° ............................................ .0307

In the above table the distance y indicates the needed correction in inches for a sphere having a radius of one inch.

It is further to be noted that the error y is borne by three adjacent members, i.e. two adjacent bearings and the mass of the cage 21 lying between the two, see FIGURE 2.

In FIGURE 8, the rectangle indicates the plane of the cage 21 in the position x. It is seen from FIGURE 7 that when two adjacent trunnions are both in the great circle 46, the cage is inclined to the right at an angle e from the angle bisecting plane 47, but when the said trunnions are in the circle 45, the cage will be inclined to the left, the same amount. Hence, the cage flaps to and fro four times during each revolution of the shafts, i.e. it performs two full cycles in that time. This condition is another reason for designing the cage and the bearings as light as possible.

What I claim as my invention is:

1. A universal joint comprising two T-shaped shafts so disposed that their axes intersect at a point, two trunnions outwardly extending from each said shaft and having an axis passing through the said point perpendicularly to the said first axis, four bearings encircling the said trunnions and coaxial therewith, means for adjusting the end thrust in the said trunnions, a spherical housing enveloping the joint and firmly holding the said bearings equispaced in a plane and a curved face in each shaft near the said point so formed that the said shafts are rotatable in two mutually perpendicular planes without interference and in which each said bearing comprises a plurality of ring shaped rollers of a predetermined degree of radial flexibility, for the purposes of avoiding backlash due to wear and for reducing the vibration in the said shafts.

2. In a universal joint, the combination of two T-shaped shafts each having two outwardly projecting and integrally formed trunnions, with four bearings affixed in a housing and engaging the said trunnions in which each said bearing comprises a plurality of disk shaped rolling members and in which each said member is provided with a coaxial hole.

3. A universal joint comprising two T-shaped shafts each having two outwardly projecting and integrally formed trunnions, with four bearings affixed in a housing and engaging the said trunnions in which each said bearing comprises a plurality of disk shaped rolling members and in which each said member is provided with a coaxial hole, and in which the rollers are disposed in a circular slot having a rectangular cross section from which the rollers are protruding and contact the trunnion and in which the lower side of the said slot comprises an oil seal in contact with the said trunnion.

4. A universal joint comprising two T-shaped shafts each having two outwardly projecting and integrally formed trunnions, with four bearings affixed in a housing and engaging the said trunnions in which each said bearing comprises a plurality of disk shaped rolling members and in which each said member is provided with a coaxial hole, and in which the rollers are held in a circular slot in which the outer portion of the said slot comprises a removable cap and in which the said cap comprises an end thrust bearing in contact with the trunnion.

5. A universal joint as in claim 2 in which the enveloping housing is formed from a hollow body of revolution having two side walls, in which the said body has six apertures, in which four of the said apertures are equispaced in a plane perpendicular to the axis of the said body and house the corresponding bearings and in which the upper portions of the said bearings comprise removable caps, the outer faces of which merge with the outer circumference of the said body for the purpose of obtaining a streamlined contour of the joint having no outwardly projecting members.

6. A universal joint comprising two T-shaped drive shafts, four trunnions, four bearings encircling the said trunnions and an enveloping spherical housing, in which the said four bearings are firmly held in a plane and in an equispaced position and each comprises a plurality of ring shaped rollers, each roller having a predetermined degree of radial flexibility in which the axes of the said shafts intersect at a point, in which the said plane passes through the said point and in which the portions of the shafts adjacent to the said point are formed into curved concave-convex surfaces so formed that the shafts are rotatable in two mutually perpendicular planes without interfering with each other.

7. A universal joint comprising two T-shaped shafts, a housing and four bearings, in which the housing is formed from a hollow body of revolution having two side walls integrally formed therewith, in which each of the said walls contains an aperture so formed that the T-shaped shafts may be inserted and rotated in the said apertures, for the purpose of assembling the joint into a one-piece hollow housing and in which the said bearings comprise a plurality of ring shaped and flexible rollers.

8. A universal joint comprising two T-shaped shafts, a housing and four bearings, in which the said bearings comprise a plurality of ring shaped rollers of a predetermined degree of radial flexibility, in which the drive shafts are each rotatable about their respective axes and, in which each shaft comprises a cylindrical body, an adjacent flat portion, a curved face adjacent to the said portion and two outwardly extending trunnions disposed about an axis perpendicular to the said first axis.

9. A universal joint comprising two T-shaped shafts, four trunnions, a housing and four bearings in which each bearing comprises a circular bottom plate, a removable cap contacting the said plate and housing a plurality of disk shaped rolling members disposed in a plane in a circle and contacting each other, the said plate, the cap and the trunnion.

10. In a joint of the described type, the combination of two T-shaped shafts with four trunnions, four bearings and an enveloping spherical housing in which the bearings comprise a plurality of ring shaped rollers disposed in planes perpendicular to the said trunnions and the housing is constructed from a hollow and truncated body of revolution.

11. A universal joint as in claim 10 in which the housing is formed from a hollow truncated sphere having two side walls and six apertures.

12. A universal joint comprising two T-shaped shafts with four trunnions, four bearings and an enveloping spherical housing in which the bearings comprise a plurality of ring shaped rollers disposed in planes perpendicular to the said trunnions and the housing is constructed from a hollow and truncated body of revolution and in which the cross sections of the rollers and the cage are so calculated and the materials are so selected that the trunnions are capable of harmonically vibrating with a frequency and wave length corresponding to the shaft angle and the angular velocity of the joint as set forth in the specification for the purpose of achieving a constant ratio of transmission between the said shafts.

13. A universal joint comprising two T-shaped shafts with four trunnions, four bearings and an enveloping spherical housing in which the bearings comprise a plurality of ring shaped rollers disposed in planes perpendicular to the said trunnions and the housing is constructed from a hollow and truncated body of revolution and in which the rollers are disposed in a single plane and in which the width and the diameters of the holes are so selected that they are approximately equal to one-fourth and three-fourths respectively of the roller diameter.

14. A universal joint as in claim 12 in which the vibrations are of the order of 266 per second and the wave length is .0048" for an angular velocity of 4000 r.p.m., the radius of the joint of one inch and the shaft angle of 8°.

References Cited in the file of this patent

UNITED STATES PATENTS

| | | |
|---|---|---|
| 804,953 | Hussey | Nov. 21, 1905 |
| 897,063 | Cooksey | Aug. 25, 1908 |
| 1,450,706 | Anderson | Apr. 3, 1923 |
| 1,450,719 | Faust | Apr. 3, 1923 |
| 1,556,467 | Abell | Oct. 6, 1925 |
| 1,837,043 | Heiden | Dec. 15, 1931 |
| 2,720,434 | Trbojevich | Oct. 11, 1955 |

FOREIGN PATENTS

| | | |
|---|---|---|
| 1,003,671 | France | Mar. 20, 1952 |